United States Patent [19]

Katz et al.

[11] 3,851,574
[45] Dec. 3, 1974

[54] HEAT AND MOISTURE ACTIVATED SAVORY COATING SYSTEM FOR POPCORN

[75] Inventors: Morris H. Katz; Lawrence C. Brandberg, both of Minneapolis, Minn.

[73] Assignee: The Pillsbury Company, Minneapolis, Minn.

[22] Filed: Dec. 26, 1972

[21] Appl. No.: 318,349

[52] U.S. Cl.................426/107, 206/223, 426/111
[51] Int. Cl............................................ B65b 25/16
[58] Field of Search................. 99/646 C, 471, 474; 206/46 F, 46 PV; 426/90, 104, 106, 107–127

[56] References Cited
UNITED STATES PATENTS

| | | | |
|---|---|---|---|
| 2,673,806 | 3/1954 | Colman | 426/110 |
| 3,689,291 | 9/1972 | Draper | 426/113 |

*Primary Examiner*—Leonard D. Christian
*Attorney, Agent, or Firm*—James V. Harmon; Michael D. Ellwein

[57] ABSTRACT

Unpopped popcorn is placed in a container such as a collapsed bag together with an edible coating which coats the popcorn as it pops to provide a savory coating or glaze such as a caramel corn glaze, a cheese coating, a pizza flavored coating, etc. The coating consists essentially of a hydrophillic and or thermoplastic film former, fat and preferably salt for flavoring. The hydrophillic film former may include hydrolysates of corn starch, molasses or other amorphous sugar or other carbohydrate or gum which is converted to a film upon exposure to moisture. A flavoring such as molasses, powdered cheese or cheese flavoring or combination of herbs in the case of a pizza flavored corn is dispersed in the film former. Upon being popped the flavored coating becomes distributed over the outer surface of the popped kernels.

6 Claims, 4 Drawing Figures

PATENTED DEC 3 1974　　　　　　　　　　　　　　　　3,851,574

HEAT AND MOISTURE ACTIVATED SAVORY COATING SYSTEM FOR POPCORN

THE FIELD OF THE INVENTION

The invention relates to microwave cooking and more particularly to ready-to-pop packages of flavored popcorn suited for microwave popping.

THE PRIOR ART

The pleasing flavor and aroma of freshly popped caramel corn and other flavored corn, e.g. cheese flavored popcorn are enjoyed by many and are some of the most flavorful forms of popcorn. They are, however, unavailable in freshly popped form unless obtained at a popcorn stand or made at home using a laborious and time consuming procedure. The present invention has as a primary object the provision of a package of unpopped popcorn which upon being subjected to microwave energy will pop readily within the container to form a ready made popcorn with a flavored coating of which caramel is one example. Thus, one need merely place a package containing unpopped corn together with the coating in an oven and pop the corn to obtain the coated and flavored product.

OBJECTS OF THE INVENTION

The invention has among its objects the provision of a coated popcorn composition having the following advantages and characteristics: (a) a flavored coating which becomes distributed over the popped kernels as the kernels are popped within a flexible container, (b) a system for popping corn to provide a coated flavored popcorn product wherein the unpopped kernels can be stored in intimate relationship with a coating substance that becomes distributed over the surfaces of the kernels as they pop; (c) the provision of a collapsed package of unpopped popcorn that can be popped to provide a coated popped product having any desired flavor such as caramel, cheese, pizza, etc. wherein the coating will remain adhered to the kernels after popping; (d) the provision of a sugar based coating for unpopped corn which coats the surfaces of the popped kernels and is actuated by moisture generated during the popping process to form a coating film.

THE FIGURES

SUMMARY OF THE INVENTION

Figure 1:
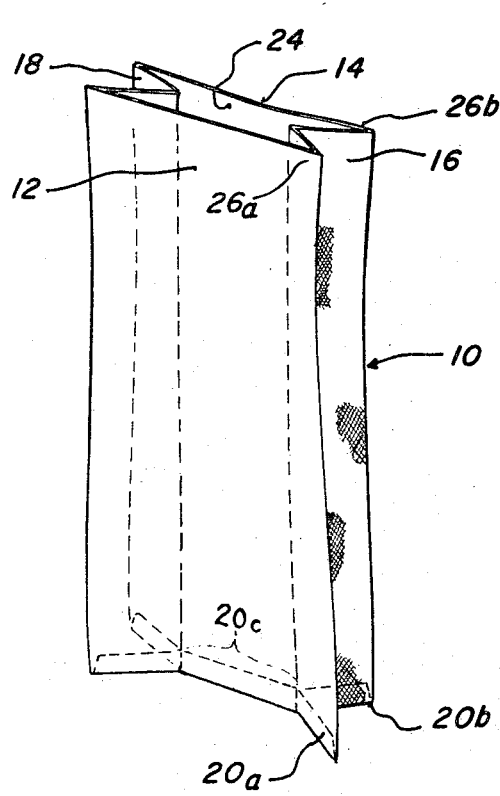
FIG. 1 is a perspective view of an empty package embodying the invention.

Unpopped popcorn is placed in a container such as a collapsed bag together with an edible coating which upon being popped coats the popcorn to provide a savory coating or confection coating such as caramel corn glaze, a cheese coating, a pizza flavored coating, etc. The coating consists essentially of a hydrophillic and thermoplastic film former, fat and preferably salt for flavoring. The hydrophillic film former may include hydrolysates of corn starch, molasses or other amorphous sugar, in general any edible hydrophillic film former such as carbohydrate or gum which is thermoplastic and is converted to a film upon exposure to moisture. A flavoring such as molasses, powdered cheese or cheese flavoring or herbs is dispersed in the film former. Upon being popped the flavored coating becomes distributed upon and adheres to the outer surface of the popped kernels.

DESCRIPTION OF THE PREFERRED EMBODIMENT

As seen in the figures, a flexible package 10 is provided which consists of paper sidewalls 12 and 14 with longitudinally extending gussets 16 and 18 on each side to provide a sizable expansion volume. The bottom is sealed tightly by transverse seals 20a and 20b which merge at the center 20c. The package preferably consists of two layers of flexible sheet material. One preferred outer sheet material is bleached kraft paper. A suitable liner 24 consists of glasine paper.

After the package has been filled with a charge of a mixture of popcorn and the coating composition of this invention the top is sealed at 26a and 26b which merge with the single seal in the center 26c (FIG. 3) provided with a central opening 28 and serves as a steam exhaust of restricted size for the purpose of allowing the steam to be vented but appears to provide a slight amount of back pressure to help expand the bag.

Figure 3:
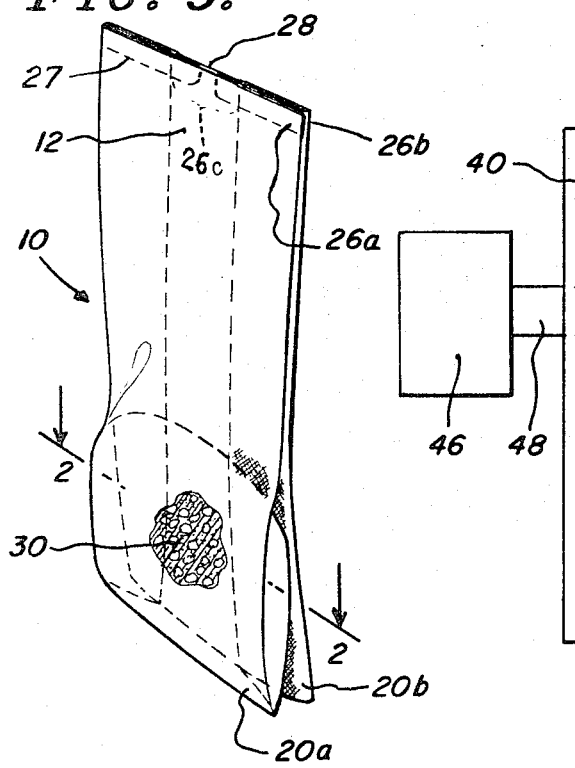
FIG. 3 is a perspective view of the sealed and filled package prepared in accordance with the invention.
Figure 4:
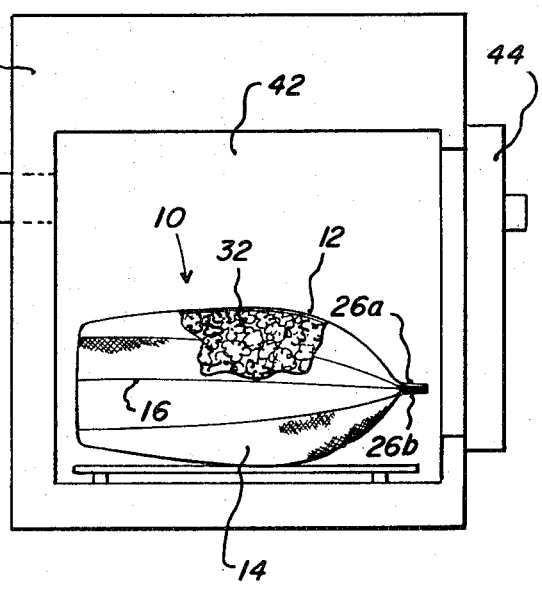
FIG. 4 is a vertical sectional view of the package as it appears when it is being popped in a microwave oven.

In an alternative form of top seal construction (not shown) the top of the package is left unsealed across its entire width but is collapsed against itself substantially as shown in FIG. 3. This collapsed section is folded downwardly along the transverse line 27 and a piece of tape or the like is used to hold the downwardly folded portion against the adjacent section of the sidewall 14. In this construction, the steam escapes through the restricted opening across the entire width of the bag between the adjacent folded sheets.

Figure 2:
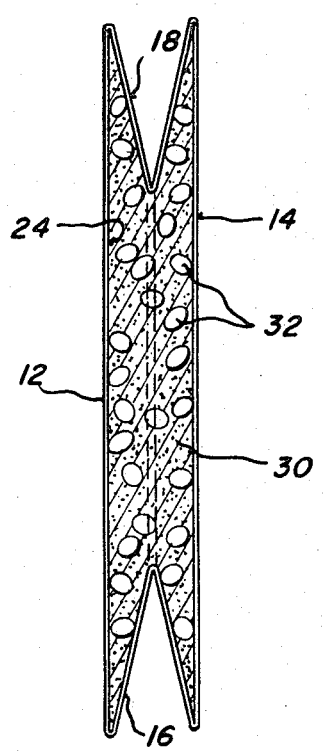
FIG. 2 is a transverse section taken on line 2 — 2 of FIG. 3.

The charge of popcorn 32 within the lower portion of the package 10, can be best seen in FIGS. 2 and 3. The popcorn 32 is uniformly mixed with the coating composition to be described below.

While the package shown is formed from paper, any flexible non-metallic microwave permeable sheet material can be used which has sufficient heat resistance to withstand the temperatures on the order of about 325° F. The package must be both flexible and expandable. A variety of packaging materials will be apparent. Polyolefins are satisfactory in most respects but are not usually suitable from the standpoint of toxicity. Nylon and polyester films will provide outstanding results but are more expensive than paper. A paper package consisting of two layers is particularly good. The glasine liner has been found to satisfactorily limit grease absorption. A restricted vent at the top provides sufficient gas retention so that expansion of the package is facilitated without any danger of the package bursting.

In one preferred application, the dimensions of the bag when collapsed are 7 inches by 10 inches with gussets extending two inches toward the center of the package from the side edges. Into a bag of this size is placed about 30 grams of the coating composition and 80 grams of popcorn.

The hydrophillic film former can comprise any of the edible gums, carbohydrates such as pregelatinized starch, hydrolsates of corn starch, molasses amophous sugars and the like. Special hybrid corn, which is bred for their "handling" characteristics (resistance to breakage during tumbling on coating) is preferred. It isn't necessary to use these "tougher" varieties of corn with the present process.

It has been found that the corn may be mixed with any edible and hydratable thermoplastic film former. These substances include albumin, gelatin, agar, soy protein, wheat germ, wheat protein, and milk solids, all of which are proteinaceous, and may further include non-protein film-formers such as starch and even methyl cellulose or carboxyl methyl cellulose which produce the required edible film structures but are not nutritive. The film formers may be intermixed and proportioned and, further, may have fillers added thereto for altering the flavor and texture of the ultimate product without changing the character of the physical structure or the procedure by which such structure is obtained. In some instances, a hydratable film former may be employed naturally having a filler portion which does not interfere with the proteinaceous portion in producing a cellular structure. Such film former is exemplified by other sugars which may be employed without disturbing the basic procedure.

It was found that sucrose alone will not, however, serve the purposes of the invention. If carbohydrates with sweetening characteristics are desired, high dextrose equivalent corn syrups are used. Conversely, when less sweetening power is desired low dextrose equivalent syrups are used.

If the dextrose equivalent of the carbohydrate is more than 26 it is known as a corn syrup solids and will impart a sweeter taste to the finished composition. On the other hand, if the dextrose equivalent (DE) is less than 26, the product is often referred to as a maltodextrine and will be expected to impart less sweetness to the composition.

It is preferred to provide the carbohydrate film former in the amphorous or glassy state. If sucrose is used a moisture increase can cause the sucrose to crystallize which is, of course, undesirable.

When corn syrup and sucrose are used together, they are used in the ratio of about two parts corn syrup for each one part of sucrose although in some cases they can be used in equal quantities. It is preferred to use from about one to five parts of sucrose when present for each four parts of corn syrup solids.

Other carbohydrates can be used such as dried malt syrup, enzyme converted dried barley malt extract containing both maltose and dextrose as well as acid or enzyme hydrolyzed starch, e.g. Mor-Rex or Maltrin, which are made by the CPC International of Englewood Cliffs, New Jersey and Grain Processing Corporation of Muscatine, Iowa respectively.

Somewhat more sweetness is provided by sugar containing sweeteners such as fructose containing syrups, maltose containing syrups, invert sugars in dry forms, higher dextrose equivalent cereal starch hydrolysates, galactose, honey and the like. The maximum amount of sucrose that can be used in a composition depends in part on the DE of the film former because the higher the DE the greater its hygroscopicity. Thus, even amorphous sucrose can be used alone if the moisture content of the composition is low enough, or it is in a frozen state so that no moisture can migrate from the kernels into the coating to facilitate recrystallization of the sucrose.

Sugars such as maltose, invert sugar and fructose which are hygroscopic appear to protect the sucrose from crystallization when sucrose is used in the amorphous form.

The amount of film former used is determined in part by economic consideration and in part by the amount required to produce a glassy film or glaze over the kernels. It has been found in general that when corn syrup solids is used it should be present in the amount from about 1/2 the amount of popcorn to about five parts for each three parts of popcorn present.

Among the gums that can be employed are gelatinized starch, gum arabic, arabino galactan, carrageenan, Irish Moss extractives, guar gum, alginates, pectin gels, carboxymethyl cellulose. The amount of these gums that can be employed depends upon how hygroscopic they are in the composition. If too hygroscopic, of course, liquification of the product could become a problem.

The fats can comprise any of various edible shortenings provided that the melting point is not so high that the fat gives the product a greasy or wave taste when eaten. It can also consist of a mixture of fat and moisture, including but not limited to oleomargarine or butter which normally contains about 18 to 20 percent moisture.

In a preferred form of the invention some form of edible fat is used. The edible fat can consist of an animal or vegetable shortening, butter or oleomargarine. Butter or margarine, however, have a tendency to char and therefore are not preferred. Better results can be achieved by employing a combination of butter oil and moisture.

Among the various shortenings that can be used are any of the well known edible animal/vegetable oils or fats. Vegetable oils and fats are preferred because of their lower melting points. Suitable ones include hydrogenated or unhydrogenated coconut, peanut oil, cottonseed oil, soybean oil, corn oil, safflower and sunflower oil provided the latter two are of the grade which is relatively high in polyunsaturates. While animal fats can be used, lower melting point oils are much preferred because of the tendency of animal fats to solidify and give the finished popcorn a waxy or greasy taste.

The amount of fat used can be varied greatly since much is absorbed by the corn. In general, the amount of fat can comprise about one part of fat for each three parts of corn together with about four parts glaze.

The coating composition is preferably prepared in the following manner:

The flavors and/or seasonings are preblended before adding the corn syrup solids and starch. The complete flavor mix with starch is then blended with the salt. This total dry mix is dispersed in the shortening which has been melted to make a uniform plastic (while at or above the melting point of the shortening) dispersion. The popcorn kernels are then added to the portions of the flavor, film former and shortening premix in the individual containers.

After the package is filled and sealed as shown in FIG. 3 it is preferably placed in refrigerated or frozen storage until it is ready to be used. When the popcorn is to be popped, the package is placed in the cooking chamber 42 of a microwave oven 40 having a capacity of about 1,000 to 1,400 watts have a source of microwave energy 46 connected to the oven cavity by means of a wave guide 48 or other suitable energy transfer means. As microwave energy is supplied to the cavity, the package 10 is expanded by the expanded bulk of the popped corn and then becomes filled with the popped corn.

A preferred method of preparing the coating is to intimately mix the film former, flavor and fat. Mixing can be accomplished by placing the shortening in a Hobart mixer and mixing at medium speed for a minute until softened. Film former is then added and mixing is continued for two to three minutes at high speed. The flavor is then added and mixing is continued for about 30 seconds to a minute. The corn is added next and mixing is continued for 1 minute. The bags are then loaded with sufficient mix for each bag of about 260 cu. in. capacity.

These packages are popped in a 1,200 watt microwave oven such as a 1,200 watt Litton Industries, Inc. oven in 1 minute and 45 seconds if stored frozen or in 1 minute and 30 seconds if stored at room temperature.

During the popping operation, the heat and moisture released as the corn pops activates the dispersion and causes the kernels to become coated.

A great many variations can be made in the invention, for example, a dispersion containing moisture can be made by micro encapsulating moisture in an edible fat or wax such as microcrystaline wax. The particles of encapsulated water can be mixed with sucrose, corn syrup solids and flavors in dry particulate form. In that case, all materials in the coating would be in a free flowing particulate form.

The invention will be better understood by reference to the examples which were prepared as follows:

The flavors and/or seasonings are preblended before adding the corn syrup solids and starch. The complete flavor mix with starch is then blended with the salt. This total dry mix is dispersedn the shortening which has been melted to make a uniform plastic (while at or above the melting point of the shortening) dispersion. Popcorn kernels are then added to portions of the flavor, film former and shortening premix in the individual containers.

Example 1

| Cheese Flavor: | | | |
|---|---|---|---|
| | Popcorn | 14.0 | gms. |
| | Shortening | 4.0 | gms. |
| | Salt | 1.75 | gms. |
| | Powdered Cheese Flavor | 0.25 | gms. |
| | Corn Syrup Solids | 6.00 | gms. |
| | Starch, Gelatinized | 1.00 | gm. |
| | Shortening | 1.00 | gm. |

Example 2

| Pizza Flavor: | | | |
|---|---|---|---|
| | Popcorn | 14.0 | gms. |
| | Shortening | 4.0 | gms. |
| | Salt | 1.75 | gms. |
| | Powdered Cheese Flavor | 0.50 | gm. |
| | Ground Oregano | 0.07 | gm. |
| | Powdered Garlic | 0.05 | gm. |
| | Onion Powder | 0.15 | gm. |
| | White Pepper | 0.03 | gm. |
| | Paprika | 0.25 | gm. |
| | Corn Syrup Solids | 6.00 | gms. |
| | Starch, Gelatinized | 1.00 | gm. |

Example 3

| Caramel Corn: | | Percent by weight |
|---|---|---|
| | Popcorn | 35.50 |
| | Corn Syrup Solids | 30.00 |
| | Sugar | 18.00 |
| | Caramel (Flavor & Color) | 1.40 |
| | Salt | 4.90 |
| | Shortening | 10.20 |
| | | 100.00% |

Enough of the composition of Example I was placed in a bag to provide 80 grams of popcorn for each bag. In the compositions of examples 2 through 3, greater or lesser amount of coating can be used to provide a product having the desired characteristics. Popping was carried out in a 1,200 watt microwave oven for about 2½ minutes to produce the popped and coated kernels.

What is claimed is:

1. A package of popcorn ready for popping in a microwave oven comprising an expandable package formed from a flexible sheet material transparent to microwave energy, said package having at least one steam exhaust opening therein of sufficient size to allow the exhaust of gas and steam without bursting the package, a charge of unpopped corn in the package and from about one to eight parts of a dispersion of an edible fat and an edible hydrophillic and thermoplastic film former by weight for each eight parts by weight of corn, said dispersion comprising sufficient edible fat whereby when the package is placed in said oven, the corn will be popped and simultaneously coated with the dispersion.

2. The package according to claim 1 wherein the dispersion comprises about 80 percent to 90 percent by weight of fat and the balance comprising said film former.

3. The package of claim 2 wherein the dispersion is prepared by providing a mixture of film former and fat and vigorously mixing the mixture until a homogeneous dispersion is obtained.

4. A package of popcorn kernels uniformly mixed with an edible film former and sucrose for popping in a microwave oven comprising an expandable package formed from a paper bag provided with longitudinally extending gussets therein to promote expansion of the bag, said bag having a steam exhaust opening therein of sufficient size to allow gas and steam escape without bursting the bag and about one to 10 parts of an edible film former and sucrose for each eight parts by weight of corn.

5. A package of unpopped popcorn adapted to form a coated popped corn product comprising a container and a quantity of corn therein together with a coating composition comprising edible hydrophillic and thermoplastic film former comprising amorphous sugar, the development of heat and the evolution of the moisture from the corn kernels during popping being adapted to activate the hydrophillic film former to form a coating in the kernels.

6. A package of unpopped popcorn adapted to form a coated popped corn product comprising a container and a quantity of corn therein together with a coating composition comprising a hydrophillic film former and sucrose as a continuous phase and an edible fat dispersed therein as a discontinuous phase, the development of heat and the evolution of the moisture from the corn kernels during popping being adapted to activate the hydrophillic film former to form a coating on the kernels.

* * * * *